Jan. 17, 1939.  E. J. FRASER ET AL  2,144,243
COUPLING MECHANISM FOR TRAILERS AND TRACTORS
Filed April 9, 1938  3 Sheets-Sheet 1
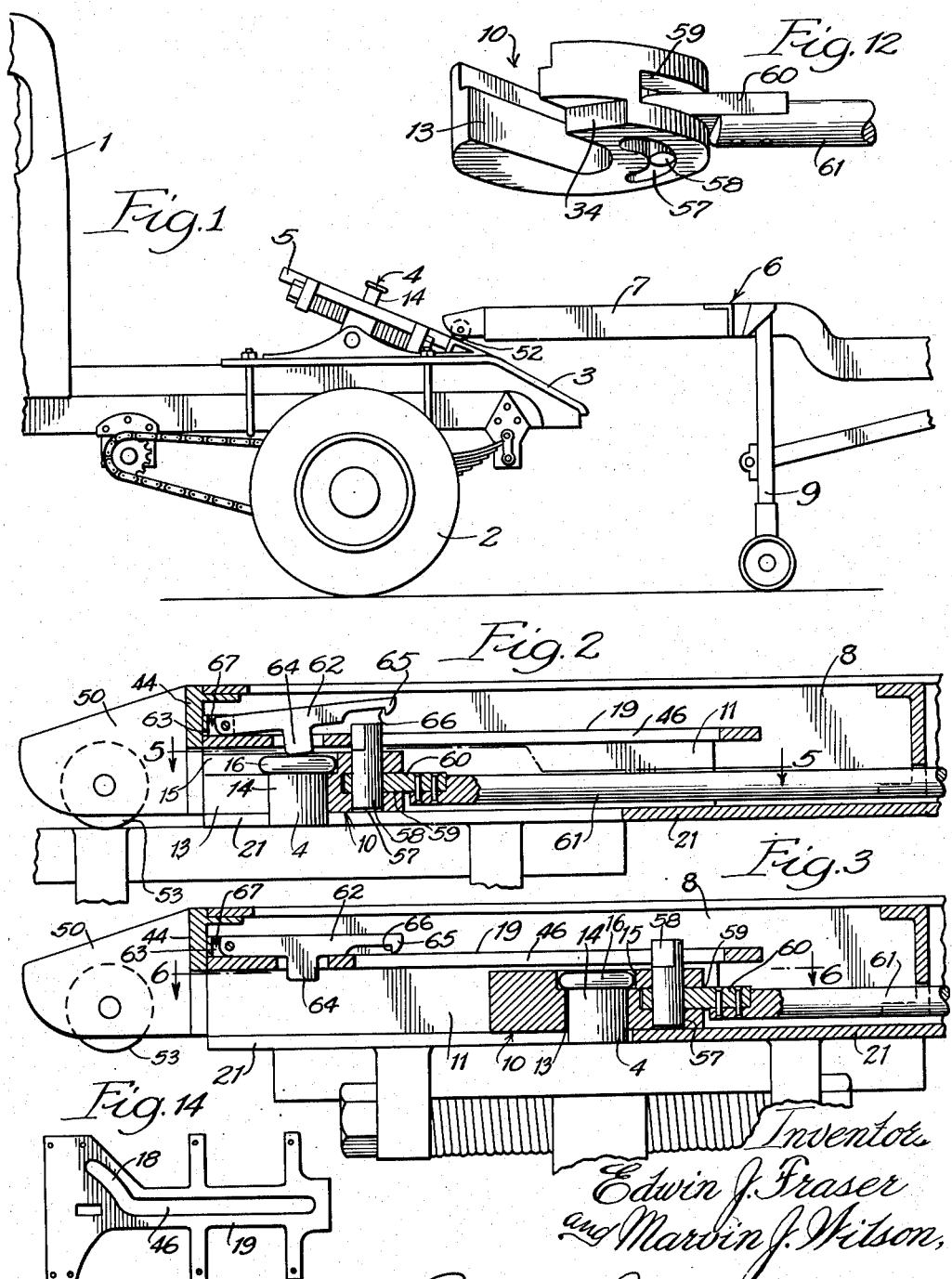

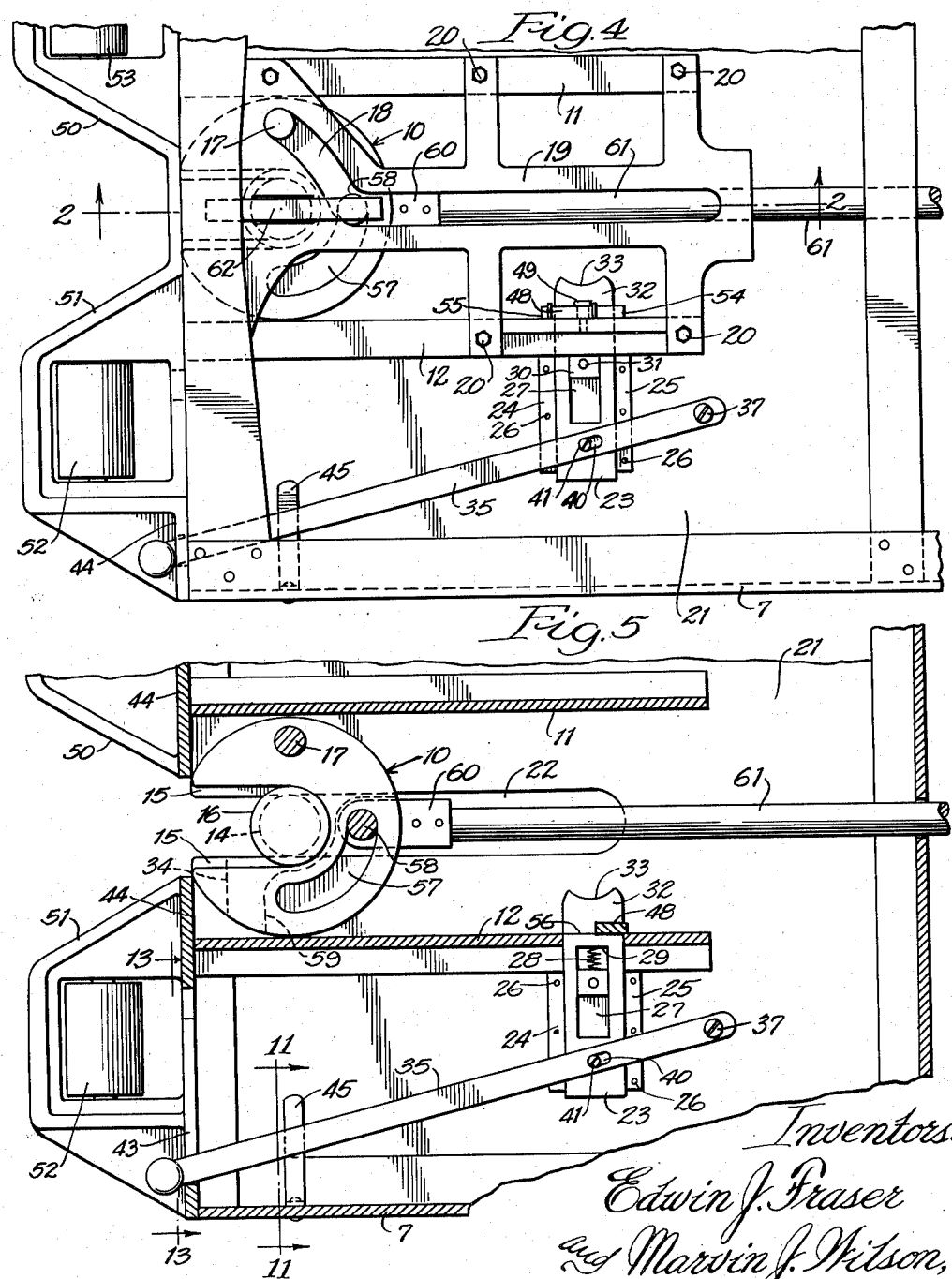

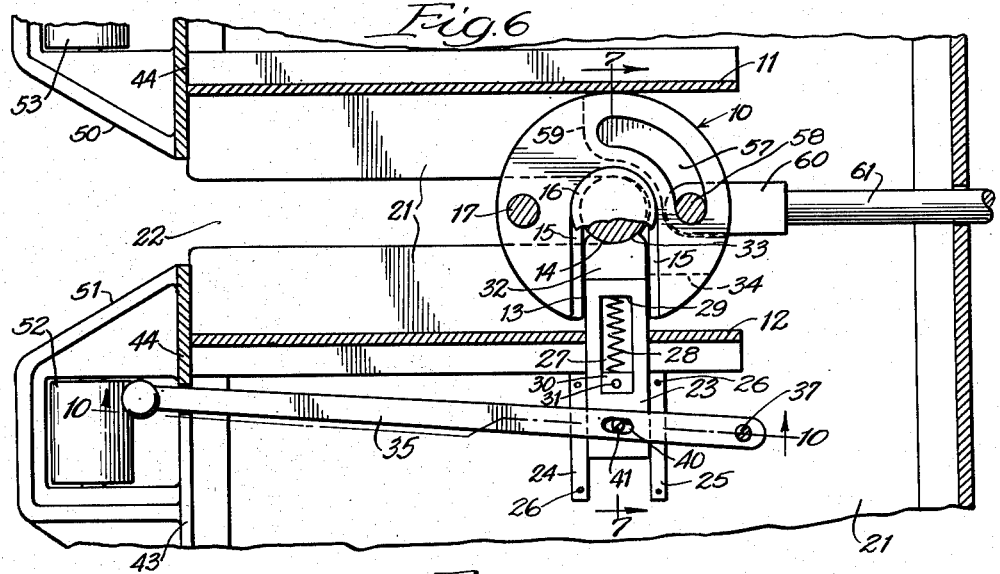
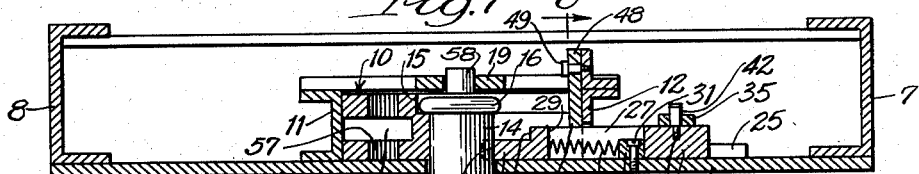
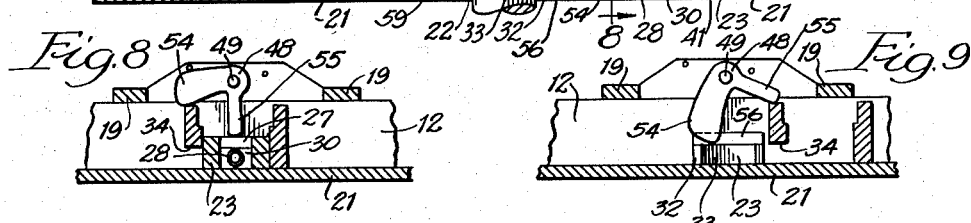
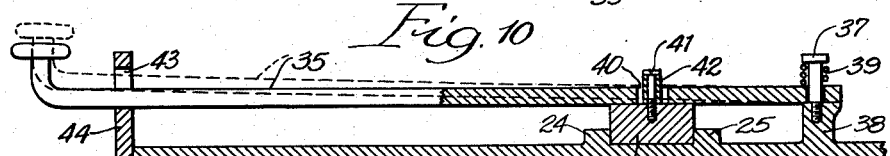
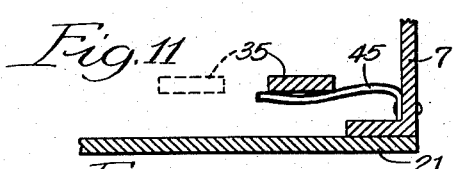

Patented Jan. 17, 1939

2,144,243

UNITED STATES PATENT OFFICE 2,144,243

COUPLING MECHANISM FOR TRAILERS AND TRACTORS

Edwin J. Fraser, Riverside, and Marvin J. Wilson, Chicago, Ill.

Application April 9, 1938, Serial No. 201,068

19 Claims. (Cl. 280—33.1)

This invention relates to improvements in coupling mechanisms and more especially to those adapted for detachably connecting a trailer to a tractor vehicle. It has particular reference to improvements in a type of construction known as a fifth wheel coupling.

The main objects of this invention are to provide an improved form of such a coupling characterized by reliability, strength and simplicity; to provide such an automatic coupling mechanism which will positively articulate a tractor and a trailer so that they will function as one vehicle; to provide a coupling mechanism wherein the kingpin is arranged to abut against the closed axial inner end portion of the mouth of a rotary lock element or rotor of the coupler and remain there during a partial rotation and a bodily rearward and forward movement of that element; to provide a lateral locking device arranged for limited projection into a coupler guide channel at all times and over which a part of the rotor passes; to provide a means for positively locking the rotor statically when it reaches its maximum rearward movement in the coupling operation; to provide a means for positively locking the coupling mechanism statically when in uncoupled forward position and also keeping the coupler rotor mouth in alinement with a kingpin guide slot in the bottom frame plate of the coupler; and to provide a floating type of coupling mechanism having these characteristics.

It is also an object of this invention to provide a device that is relatively simple in construction, positive in operation, and sufficiently durable to withstand all shocks and strains incident to its use.

All these and further objects and advantages of the invention will be apparent from the following description taken in connection with the accompanying drawings and claims.

This invention is illustrated by the accompanying drawings in which:

Figure 1 is a fragmental side elevation of the interconnecting parts of a tractor and trailer prior to being coupled.

Fig. 2 is a vertical longitudinal section taken on the line 2—2 of Fig. 4, showing the kingpin in uncoupled position.

Fig. 3 is a cross-sectional view taken as on the line 2—2 of Fig. 4, but showing the kingpin in coupled position.

Fig. 4 is a fragmental top plan view.

Fig. 5 is a horizontal section taken on the line 5—5 of Fig. 2.

Fig. 6 is a horizontal section taken on the line 6—6 of Fig. 3.

Fig. 7 is a vertical section taken on the line 7—7 of Fig. 6.

Fig. 8 is a vertical section taken on the line 8—8 of Fig. 7, the latch withholder being disengaged, and the latch released to lock the rotor.

Fig. 9 is a sectional view similar to Fig. 8 but showing the rotor latch withdrawn and the latch withholder engaged to restrain the latch; the coupler being unlocked.

Fig. 10 is a vertical section taken on the line 10—10 of Fig. 6.

Fig. 11 is a vertical section taken on the line 11—11 of Fig. 5.

Fig. 12 is a perspective view of the floating lock rotor.

Fig. 13 is a vertical sectional view taken on the line 13—13 of Fig. 5.

Fig. 14 is a top plan of the cover plate showing the cam guide slot therein.

Referring more in detail to the drawings, Fig. 1 shows the rear portion of a tractor I which is equipped with the usual rear drive wheels 2, a ramp plate 3 secured to the tractor frame, and a kingpin 4 fixed on transversely pivoted tiltable table 5, together with the trailer 6 equipped with the usual body portion not shown, mounted on the side frames 7 and 8 to which are attached drop or land wheels 9.

The present invention is directed to the coupling mechanism, commonly referred to as the fifth wheel which comprises in combination the kingpin 4, (lower fifth wheel element) located on tractor I and the coupling lock mechanism (upper fifth wheel element) located on the forward end part of the trailer and positioned between the two side frame members 7 and 8.

Although the present construction shows the coupling lock mechanism located on the trailer and the kingpin on the tractor, it is to be understood that their positions may be reversed.

The floating rotorlike coupler or pin lock 10 is positioned between the two frames 11 and 12 which form a guideway therefor. Said lock 10 is provided with a kingpin receiving slot or mouth 13 which is slightly wider than the diameter of the throat portion 14 of the kingpin 4. The slot 13 extends toward and slightly beyond the pivotal axis of the rotor 10 so that when the kingpin is seated in the slot the kingpin and rotor will be coaxial. The rotor 10 is also grooved about the upper edge of the mouth slot 13 as at 15 to freely accommodate the pin head 15.

The coupler rotor 10 is provided, laterally of slot 13 and close to the rotor's front edge in its locking position, with an upstanding guide lug 17 adapted to travel in the guide cam slot 18 in the upper frame or cover plate 19 which spans the frames 11 and 12 and is secured thereto by means of bolts or the like 20.

The lower face of the rotor 10 rides on the upper face of the bottom plate 21, which plate has a king-pin guide slot 22 of a width to receive the throat 14 of kingpin 4, the width being like that of the rotor kingpin receiving slot 13.

An automatic means for positively retaining the rotor and kingpin in locked relationship is provided adjacent and closed rearward end of the kingpin guide slot 22. It comprises a shiftable bar 23 slidably mounted crosswise of slot 22 between a pair of guide channel members 24 and 25 secured to the bottom plate 21 by means of bolts or the like, 26. The medial portion of bar 23 is cut away to form a housing 27 to receive a helical compression spring 28. One end of the spring bears against shoulder 29 of bar 23 while the other end is secured to a bearing block 30 anchored to the bottom plate 21 by any suitable means 31 such as bolts or the like.

The forward end portion 32 of bar 23 is cut away on its upper side and is arranged to extend into the rotor guide channel at all times. The inner end 33 of the portion 32 is arc shaped to conform to the cylindrical shape of throat 14 of the kingpin and seat against it when the kingpin has traveled rearwardly to the end of the guide slot 22 and bar 23 is free to enter the rotor mouth 13. In order to allow the coupler 10 to pass over the bar part 32 which extends into the coupler guide channel, the rotor is cut away as at 34.

The locking bar 23 must be manually shifted to release the coupling rotor in order to allow the kingpin to become disengaged from the trailer, and hence a handle is provided comprising a bar 35 pivotally secured at one end to the bottom plate 21, but in the embodiment shown, particular reference being had to Fig. 10, a machine screw 37 as illustrated is shown seated in a bearing member 38 which is secured to the bottom plate 21 as by welding, brazing or the like. A compression spring 39 is placed on the shank of the screw 37 between its head and the upper portion of the bar 35 to effect downward resilience at the free end of the bar. A slot 40 in the bar 35 accommodates an upstanding lug 41 and collar 42 (Fig. 10) secured to the lock bar 23 in a position thereon best shown in Figs. 4 and 5.

A horizontally extending Z-like guide slot 43 (see Fig. 13) is cut into the forward chassis frame 44 of the trailer through which the bar 35 extends. A leaf spring 45 is secured to the trailer side chassis frame 7 in the manner and position shown in Fig. 11 to provide a means to retain the bar 35 in the upper notched portion 47 of the slot 43 and so insure retaining the lock bar 23 normally in open position.

To further insure that the lock bar 23 will be kept in open position when the trailer is disconnected a bell crank latch 48 is secured pivotally by a machine screw bolt or the like to the frame 12 as at 49 so that its arm will extend into the coupler guide channel and be operable through the movement of rotor 10.

The forward part of the trailer is equipped in the usual way with a pair of angularly disposed guide members 51 and 61 which are each provided with rollers 52 and 53 to facilitate raising the fore part of the trailer during the coupling operation.

In operation to couple the tractor to the trailer, the handle bar 35 is first forced out of the notch 47. It will be found to ride freely in slot 43 adjacent the notch 47 but disengaged therefrom. The tractor is then backed up to the trailer and the rollers 52 and 53 will contact the ramp 3 and roll upwardly on said ramp and onto the tiltable table 5. Upon continued backward movement of the tractor the kingpin will be guided into the kingpin guide slot 22 by means of guides 50 and 51. At the same time the kingpin enters the guide slot 22, it enters the kingpin receiving slot 13 in the coupler rotor 10 until it reaches the position shown in Fig. 5.

Upon further rearward movement of the kingpin, the coupler will be rotated in a counterclockwise direction substantially 90° because of the camming action set up by the travel of the lug or crank pin 17 in the cam slot 18. It is to be noted that the kingpin locking disk rotor 10 travels rearwardly simultaneously with the rotary movement until the cam lug 17 reaches the lineal slot 46 which extends in a direction parallel to that of the kingpin guide slot 22. During the time the lug 17 travels in the slot 46 the coupler 10 is not rotated but is merely shifted bodily in a lineal movement until the kingpin reaches the closed end of the kingpin guide slot 22.

When the coupler rotor 10 approaches the end of the guide slot 22 it will pass over the cut-away portion 32 of the lock bar and simultaneously abut against the arm 54 of the bell crank latch and shift it out of the position shown in Fig. 9 and away from the upstanding end wall 56 of the lock bar 23, so that when the coupler reaches the end of its rearward movement which is at that point when the kingpin reaches the end of the kingpin guide slot 22, the locking bar will then automatically be projected into the kingpin receiving slot or mouth 13 by the action of the compression spring 28 and positively lock the kingpin and coupler in complete or full coupled position (see Fig. 6). Simultaneously the bar 35 is shifted automatically to the position shown in Fig. 6.

To uncouple the trailer and tractor the handle bar 35 is shifted to the position shown in Figs. 4, 5, and 13 thereby withdrawing the lock bar 23 out of the slot 13. By forward movement of the tractor the coupler will abut against and shift the arm 55 of the bell crank latch from the position shown in Fig. 8 to that shown in Fig. 9 where it will hold the lock bar retracted and away from its rotor locking position regardless of any movement of the handle bar 35. Upon further forward movement of the tractor, the rotor is drawn forward bodily without any turning movement until the cam lug or crankpin 17 reaches the cam slot 18, whereupon the rotor is turned in a clockwise direction while still being moved forwardly until the lug 17 reaches the position shown in Fig. 4, the kingpin receiving slot is turned to the position shown in Figs. 2, 4 and 5, and the tractor is thereby released from the trailer.

Another feature of this invention consists in the novel arrangement of a mechanism for raising and lowering the land wheels of the trailer.

In order to accommodate for this mechanism, the coupler is provided with a pair of corresponding cam slots 57 through which a cam pin 58 extends. A horizontal aperture 59 is also provided in the vertical edge wall of the coupler to accommodate a tongue bar 60. The pin 58 extends through an aperture located adjacent the medial end portion of said bar 60 and is integrally secured thereto. A long cylindrical shaft 61 integrally attached to said tongue 60 extends rearwardly to suitable land wheel raising and lowering mechanism, usually a linkage mechanism. This mechanism is not shown in the drawings as it is presumed that such mechanism is well understood by those familiar with this art.

It can readily be seen that, upon rearward movement of the kingpin in the jaw 13, the pin 58 will be shifted from the position shown in Fig. 4 or 5 to that shown in Fig. 6, due to the action of the pin 58 in the cam slots 57, and that then upon further rearward movement of the trailer to its locked position, the bar 61 will be forced rearwardly to operate the mechanism for shifting the land wheels from ground engaging position to an inoperative position. Similarly upon forward movement of the coupling mechanism, the bar 61 will be drawn forwardly causing the land wheels to be lowered, and then at the time when the lug 17 reaches the beginning of the cam slot 18 and starts shifting to the position shown in Fig. 4, the pin 58 will shift from the position shown in Fig. 6 to the position shown in Fig. 5, thereby causing the land wheels to shift from inoperative position to ground engaging position. It will be noted that the shaft 61 is shifted in a linear direction at all times, which direction is parallel to rotor rectilinear way.

In order to positively insure that the ground engaging wheels do not shift from the position shown in Fig. 1, we have provided a T-shaped locking means 62, see Figs. 2 and 3, hingedly secured to a bracket 63 and extending rearwardly from the front chassis frame 44. The locking means 44 is positioned over the middle of the kingpin guide slot 22 in the bottom plate 21, so that the downwardly extending portion 64 of the T will be positioned in approximately the dead center axis of the head 16 of the kingpin 4 when it moves in the guide slot 22. The free end 65 of the locking mechanism 52 is provided with a cut-away portion 66 to form a recess to engage the pin 58 and prevent the coupler rotor from shifting rearwardly when the coupler is in uncoupled position.

It can readily be seen that when coupling the tractor to the trailer the kingpin will first engage the downwardly extending portion 64 of the lock 62 which rides on the head 16, raising the recessed portion 66 to allow rearward movement of the coupler rotor, and when the coupler is being disengaged, the kingpin will again first raise the locking mechanism 62 by engagement with the downwardly extending portion 64 to raise the free end of the same and allow the pin 58 to reach the position shown in Fig. 2, whereupon the recessed portion 58 will drop downwardly by gravitation and fall over and engage the pin 58 to insure positive dropping of the free end of the lock 62 from its raised position and additional means such as a compression spring 67 is employed.

It is to be understood that some of the details set forth may be altered or omitted without departing from the spirit of the invention as defined by the following claims.

We claim:

1. In a tractor-trailer combination, a vehicle having a fifth wheel including a kingpin, a second vehicle provided with a complementary fifth wheel comprising a rotatable coupler having a kingpin receiving mouth slot, a rectilinear guide means for said coupler, said kingpin being adapted to bodily shift said coupler along said guide means, and means including said king-pin to simultaneously rotate said coupler about the king-pin axis during the first part of its coupling movement.

2. In a tractor-trailer combination, a vehicle having a fifth wheel including a kingpin, a second vehicle provided with a complementary fifth wheel having a kingpin guide slot, a rotatable coupler having a kingpin receiving mouth slot, a rectilinear guide means for the coupler, said kingpin being adapted to shift said coupler along said guide means, and means including said king-pin to simultaneously rotate said coupler about the king-pin axis during the first part of its coupling movement.

3. In a tractor-trailer combination, a vehicle having a fifth wheel including a kingpin, a second vehicle provided with a complementary fifth wheel comprising a rotatable disk-shaped coupler having a kingpin receiving mouth slot, a rectilinear guide means for said coupler, said kingpin being adapted to bodily shift said coupler along said guide means, and means including said king-pin to simultaneously rotate said coupler about the king-pin axis during the first part of its coupling movement.

4. In a tractor-trailer combination, a vehicle having a fifth wheel including a kingpin, a second vehicle provided with a complementary fifth wheel comprising a rotatable coupler having a kingpin receiving mouth slot, a rectilinear guide means for the coupler, said kingpin adapted to bodily shift said coupler along said guide means, means including said king-pin to simultaneously rotate said coupler about the king-pin axis during the first part of its coupling movement, and means for locking said coupler when in complete coupled position.

5. In a tractor-trailer combination, a vehicle having a fifth wheel including a kingpin, a second vehicle provided with a complementary fifth wheel having a kingpin guide slot, a rotatable coupler having a kingpin receiving mouth slot, a rectilinear guide means for the coupler, said kingpin adapted to shift said coupler along said guide means, means including said king-pin to simultaneously rotate said coupler about the king-pin axis during the first part of its coupling movement and means for locking said coupler when in coupled position.

6. In a tractor-trailer combination, a vehicle having a fifth wheel including a kingpin, a second vehicle provided with a complementary fifth wheel having a kingpin guide slot, a rotatable coupler having a kingpin receiving mouth slot, a rectilinear guide means for the coupler, said kingpin adapted to shift said coupler along said guide means, means including said king-pin to simultaneously rotate said coupler about the king-pin axis during the first part of its coupling movement, means for locking said coupler when in coupled position, and means to lock said coupler in uncoupled position to prevent shifting thereof.

7. In a tractor-trailer combination a vehicle having a fifth wheel mechanism including a king-pin, a second vehicle provided with a complementary fifth wheel mechanism having a kingpin guide slot, a rotatable coupling means having an axis in the center line of the kingpin movement and coincident with the axis of said kingpin when in engagement therewith, a rectilinear guideway for said coupler, said kingpin being adapted to bodily shift said coupler rearwardly along said guideway, and means to rotate said coupler on the kingpin axis upon rearward movement of said kingpin in coupling direction.

8. In a tractor-trailer combination a vehicle having a fifth wheel mechanism including a kingpin, a second vehicle provided with complementary fifth wheel mechanism comprising a rotatable coupling means having an axis in the center line of the kingpin movement and coincident with the axis of said kingpin when in engagement therewith, a rectilinear guideway for said coupler, said kingpin being adapted to bodily shift said coupler rearwardly along said guideway, and means to rotate said coupler on the kingpin axis upon rearward movement of said kingpin in coupling direction.

9. In a tractor-trailer combination a vehicle having a fifth wheel mechanism including a kingpin, a second vehicle provided with a complementary fifth wheel mechanism having a kingpin guide slot and comprising a rotatable coupling means having an axis in the center line of the kingpin movement and coincident with the axis of said kingpin when in engagement therewith, a rectilinear guideway for said coupler, said kingpin being adapted to bodily shift said coupler rearwardly along said guideway, means to rotate said coupler on the kingpin axis upon rearward movement of said kingpin in coupling direction, and means to lock said coupler and kingpin against withdrawal from said kingpin guide slot.

10. In a tractor-trailer combination a vehicle having a fifth wheel mechanism including a kingpin, a second vehicle provided with a complementary fifth wheel mechanism having a kingpin guide slot and comprising a rotatable coupling means having an axis in the center line of the kingpin movement and coincident with the axis of said kingpin when in engagement therewith, a rectilinear guideway for said coupler, said kingpin being adapted to bodily shift said coupler rearwardly along said guideway, means to rotate said coupler on the kingpin axis upon rearward movement of said kingpin in coupling direction, means to lock said coupler and kingpin against withdrawal from said kingpin guide slot, and manual operable means to release said locking means.

11. In a tractor-trailer combination a vehicle having a fifth wheel mechanism including a kingpin, a second vehicle having a complementary fifth wheel mechanism comprising a coupler having a kingpin receiving slot, a bottom plate having a kingpin guide slot, a cover plate having a cam slot, a rectilinear guideway for said coupler comprising a pair of guide members extending in a longitudinal direction and parallel to the kingpin guide slot, a crank pin integrally secured to said coupler and arranged to extend through and travel in the cam slot, said elements being so constructed and arranged that upon rearward movement of said kingpin it will be guided into the kingpin receiving and guide slots simultaneously and bodily shift said coupler and simultaneously rotate it substantially 90 degrees during the first part of the coupling operation and upon continued rearward movement of said kingpin it bodily and non-rotatably shifts said coupler to full coupling position.

12. In a tractor-trailer combination a vehicle having a fifth wheel mechanism including a kingpin, a second vehicle having a complementary fifth wheel mechanism comprising a coupler having a kingpin receiving slot, a bottom plate having a kingpin guide slot, a cover plate having a cam slot, a rectilinear guideway for said coupler comprising a pair of guide members extending in a longitudinal direction and parallel to the kingpin guide slot, a crank pin integrally secured to said coupler and arranged to extend through and travel in the cam slot, said elements being so constructed and arranged that upon rearward movement of said kingpin it will be guided into the kingpin receiving and guide slots simultaneously and bodily shift said coupler and simultaneously rotate it substantially 90 degrees in a counterclockwise direction during the first part of the coupling operation and upon continued rearward movement of said kingpin it bodily and non-rotatably shifts said coupler to full coupling position.

13. In a tractor-trailer combination a vehicle having a fifth wheel mechanism including a kingpin, a second vehicle having a complementary fifth wheel mechanism comprising a coupler having a kingpin receiving slot, a bottom plate having a kingpin guide slot, a cover plate having a cam slot, a rectilinear guideway for said coupler comprising a pair of guide members extending in a longitudinal direction and parallel to the kingpin guide slot, a crank pin integrally secured to said coupler and arranged to extend through and travel in the cam slot, said elements being so constructed and arranged that upon rearward movement of said kingpin it will be guided into the kingpin receiving and guide slots simultaneously and bodily shift said coupler and simultaneously rotate it substantially 90 degrees in a counterclockwise direction during the first part of the coupling operation and upon continued rearward movement of said kingpin it bodily and non-rotatably shifts said coupler to full coupling position, and means to lock said coupler in full coupled position.

14. In a tractor-trailer combination a vehicle having a fifth wheel mechanism including a kingpin, a second vehicle having a complementary fifth wheel mechanism comprising a coupler having a kingpin receiving slot, a bottom plate having a kingpin guide slot, a cover plate having a cam slot, a rectilinear guideway for said coupler comprising a pair of guide members extending in a longitudinal direction and parallel to the kingpin guide slot, a crank pin integrally secured to said coupler and arranged to extend through and travel in the cam slot, said elements being so constructed and arranged that upon rearward movement of said kingpin it will be guided into the kingpin receiving and guide slots simultaneously and bodily shift said coupler and simultaneously rotate it substantially 90 degrees in a counterclockwise direction during the first part of the coupling operation and upon continued rearward movement of said kingpin it bodily and non-rotatably shifts said coupler to full coupling position, means to lock said coupler in full coupled position, and manual operable means to release said locking means.

15. In a fifth wheel coupler mechanism a kingpin, a locking device comprising a laterally notched discoidal rotor disposed horizontally to receive said kingpin, and guide means for said rotor adapted to turn it 90 degrees in coupling and in uncoupling operations, said locking device being arranged to be bodily shifted fore and aft by engagement of said kingpin in the notch of said rotor depending upon the directional movement of the kingpin and means to lock said rotor in its effective kingpin holding position.

16. In a kingpin locking device of the class described, a disk having a radial slot adapted to receive part of a kingpin, a crank arm on said disk, a rectilinear guideway for said disk, said guideway having a slot in the middle thereof to receive another part of the kingpin for guidance thereof, a second guideway disposed opposite from the guideway slot and mainly parallel therewith but having an end portion inclined laterally, said crank arm being adapted to travel in the second said guideway and rotate said disk during part of its bodily movement and to hold it against rotation at all times, and a releasable lock to engage said disk when the coupling operation is completed, said lock being positioned laterally of the disk guideway and adjacent the end thereof which is remote from the laterally inclined end portion of the crank arm guide slot.

17. A kingpin lock comprising a rotor disk notched radially to receive the kingpin and having a crank pin thereon, a rectilinear way for edgewise guidance of said disk, a minor way for guidance of said crank pin, the latter way having a part extending diagonally of said rectilinear way near one end thereof for rotating said disk as it moves along the first said way, and means to lock said disk fixedly at a certain point in the first said way near its other end.

18. A vehicle having a kingpin and another vehicle having a kingpin lock comprising a disk rotor having an edge notch to receive said kingpin for connecting said vehicles, said rotor having a crankpin, a rectilinear way on the second said vehicle disposed lengthwise thereof for edgewise guidance of said rotor and a minor way for guidance of said crank pin, the latter way having a part extending diagonally inward from one side near the outer end of the first said way for turning said rotor as its crank pin travels therein when the rotor moves along the first said way, and said crank pin way having a straight rearward part parallel with the rotor way to prevent turning of the rotor as it travels in the rearward part of the first said way, and means adjacent the rearward end of the rotor way to engage and lock the rotor fixedly in place.

19. A first vehicle having a kingpin and a second vehicle having a fifth wheel device comprising a pair of mutually spaced upper and lower guide members, the lower guide member having a straight way and the upper a crooked slot, a horizontally disposed disk shiftable in said way the said disk having a radial mouth slot extending from edge to beyond center thereof to receive said kingpin, an upstanding arm on said disk laterally of said mouth slot to engage the upper guide slot for rotating the disk to lock and unlock the kingpin as the disk is moved in said way by said kingpin, a lock disposed laterally of said way to arrest said disk in its rearward position and means to release said lock, said way having a central slot for the kingpin, this slot being closed at its rear end to arrest the kingpin and disk and being open at its front end for release of the kingpin when it and the disk are moved forward.

EDWIN J. FRASER.
MARVIN J. WILSON.